US010519355B2

(12) United States Patent
Fukushima

(10) Patent No.: US 10,519,355 B2
(45) Date of Patent: *Dec. 31, 2019

(54) WORKING FLUID FOR HEAT CYCLE, COMPOSITION FOR HEAT CYCLE SYSTEM, AND HEAT CYCLE SYSTEM

(71) Applicant: AGC Inc., Chiyoda-ku (JP)

(72) Inventor: Masato Fukushima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,591

(22) Filed: Nov. 30, 2017

(65) Prior Publication Data

US 2018/0086959 A1   Mar. 29, 2018

Related U.S. Application Data

(63) Continuation of application No. 15/220,580, filed on Jul. 27, 2016, now Pat. No. 9,862,868, which is a continuation of application No. PCT/JP2015/052533, filed on Jan. 29, 2015.

(30) Foreign Application Priority Data

Jan. 31, 2014  (JP) ................. 2014-017031
Jul. 18, 2014   (JP) ................. 2014-148350

(51) Int. Cl.
C09K 5/04 (2006.01)

(52) U.S. Cl.
CPC ........ C09K 5/045 (2013.01); *C09K 2205/122* (2013.01); *C09K 2205/126* (2013.01); *C09K 2205/22* (2013.01); *C09K 2205/40* (2013.01)

(58) Field of Classification Search
CPC .............. C09K 5/045; C09K 2205/122; C09K 2205/126; C09K 2205/22; C09K 2205/40; F25B 1/00
USPC ................................. 252/67, 68; 62/467, 468
See application file for complete search history.

(56) References Cited

U.S. PATENT DOCUMENTS

| 9,725,632 B2* | 8/2017 | Ueno ..................... C09K 5/045 |
| 9,828,537 B2* | 11/2017 | Fukushima ............ C09K 5/045 |
| 9,862,868 B2* | 1/2018 | Fukushima ............ C09K 5/045 |
| 9,957,429 B2* | 5/2018 | Fukushima ............ C09K 5/045 |
| 9,957,430 B2* | 5/2018 | Fukushima ............ C09K 5/045 |
| 9,976,067 B2* | 5/2018 | Fukushima ............ C09K 5/045 |
| 10,072,194 B2* | 9/2018 | Tasaka .................... C09K 5/045 |
| 10,196,552 B2* | 2/2019 | Fujii ....................... C09K 5/045 |
| 2004/0070132 A1 | 4/2004 | Varzino et al. |
| 2011/0252801 A1* | 10/2011 | Minor ..................... C09K 3/30 60/645 |
| 2012/0132848 A1 | 5/2012 | Sawada et al. |
| 2014/0070132 A1 | 3/2014 | Fukushima |
| 2015/0376486 A1* | 12/2015 | Hashimoto ............ C09K 5/045 252/67 |
| 2016/0075927 A1* | 3/2016 | Fukushima ............ C09K 5/045 252/68 |
| 2016/0333241 A1* | 11/2016 | Fukushima ............ C09K 5/045 |
| 2016/0333244 A1* | 11/2016 | Fukushima ............ C09K 5/045 |
| 2016/0363354 A1* | 12/2016 | Ito ............................. F25B 1/00 |
| 2016/0369146 A1* | 12/2016 | Ueno ...................... C09K 5/045 |
| 2017/0015935 A1* | 1/2017 | Takahashi .......... C10M 171/008 |
| 2017/0328586 A1* | 11/2017 | Maeyama ................. F24F 1/32 |
| 2018/0215980 A1* | 8/2018 | Fukushima ............ C09K 5/045 |

FOREIGN PATENT DOCUMENTS

| JP | 2012-505296 | 3/2012 |
| JP | WO 2014178353 A1 | 11/2014 |
| WO | WO 2009/101840 A1 | 8/2009 |
| WO | WO 2009/101872 A1 | 8/2009 |
| WO | WO 2009/101873 A1 | 8/2009 |
| WO | WO 2011/118732 A1 | 9/2011 |
| WO | WO 2011/118733 A1 | 9/2011 |
| WO | WO 2012/157764 A1 | 11/2012 |
| WO | WO 2015/005290 A1 | 1/2015 |

OTHER PUBLICATIONS

International Search Report dated Apr. 7, 2015 in PCT/JP2015/052533, filed on Jan. 29, 2015.
Ya. A Lisochkin et al. "Explosive-Hazard Estimates for Several Fluorine-Containing Monomers and Their Mixtures, Based on the Minimum Ignition Pressure with a Fixed Igniter Energy", Combustion, Explosion, and Shock Waves, vol. 42, No. 2, 2006, 4 pages.

* cited by examiner

*Primary Examiner* — Douglas J McGinty
(74) *Attorney, Agent, or Firm* — Oblon, McClelland, Maier & Neustadt, L.L.P.

(57) ABSTRACT

A working fluid for heat cycle, a composition for a heat cycle system containing the working fluid, and a heat cycle system employing the composition are provided. The working fluid contains trifluoroethylene, 2,3,3,3-tetrafluoropropene, and difluoromethane. A proportion of the total amount of trifluoroethylene, 2,3,3,3-tetrafluoropropene, and difluoromethane based on the entire amount of the working fluid is higher than 90 mass % and at most 100 mass %. Based on the total amount of trifluoroethylene, 2,3,3,3-tetrafluoropropene, and difluoromethane, the proportion of trifluoroethylene is at least 10 mass % and less than 70 mass %, the proportion of 2,3,3,3-tetrafluoropropene is at most 50 mass %, and the proportion of difluoromethane is higher than 30 mass % and at most 75 mass %. The working fluid can replace R410A and has a low global warming potential and high durability.

8 Claims, 3 Drawing Sheets

WORKING FLUID FOR HEAT CYCLE, COMPOSITION FOR HEAT CYCLE SYSTEM, AND HEAT CYCLE SYSTEM

CROSS REFERENCE TO RELATED APPLICATIONS

The present application is a continuation of U.S. patent application Ser. No. 15/220,580, filed on Jul. 27, 2016, the entire disclosure of which is incorporated herein by reference and which is a continuation application of PCT/JP2015/052533, filed on Jan. 29, 2015, the entire disclosure of which is incorporated herein by reference and which claims priority to Japanese Patent Application Nos. JP 2014-017031 filed on Jan. 31, 2014 and JP 2014-148350 filed on Jul. 18, 2014, the entire disclosures of which are incorporated herein by reference.

TECHNICAL FIELD

The present invention relates to a working fluid for heat cycle, a composition for a heat cycle system comprising the working fluid, and a heat cycle system employing the composition.

BACKGROUND ART

In this specification, abbreviated names of halogenated hydrocarbon compounds are described in brackets after the compound names, and in this specification, the abbreviated names are employed instead of the compound names as the case requires.

Heretofore, as a working fluid for heat cycle such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for heat cycle, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture refrigerant of HFC-32 and HFC-125 in a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired. Further, development of a working fluid has been desired on the condition that R410A is simply replaced and existing apparatus will be used as they are.

In recent years, a hydrofluoroolefin (HFO) i.e. a HFC having a carbon-carbon double bond is expected, which is a working fluid having less influence over the ozone layer and having less influence over global warming, since the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases.

2,3,3,3-Tetrafluoropropene (HFO-1234yf) is known as a working fluid having a low global warming potential (GWP). However, although HFO-1234yf has a high coefficient of performance, its refrigerating capacity is low as compared with R410A, and it cannot be used for conventional air-conditioning apparatus, etc., for which R410A has been used, such as a so-called package air-conditioner and room air-conditioner.

As a working fluid employing a HFO, for example, Patent Document 1 discloses a technique relating to a working fluid using trifluoroethylene (HFO-1123) which has the above properties and with which excellent cycle performance will be obtained. Patent Document 1 also discloses an attempt to obtain a working fluid comprising HFO-1123 and various HFCs in combination for the purpose of increasing the flame retardancy, cycle performance, etc. of the working fluid.

It has been know that HFO-1134yf is useful as a HFO to be used for a working fluid for heat cycle, and a technique relating to HFO-1234yf has been developed. For example, Patent Document 2 discloses compositions containing HFO-1234yf obtainable in production of HFO-1234yf by a specific process. There are many compositions disclosed in Patent Document 2, and compositions containing HFO-1234yf and HFO-1123 are included. However, HFO-1123 is disclosed only as a by-product of HFO-1234yf together with many other compounds, and Patent Document 2 failed to disclose use of a composition containing the two in a specific proportion as a working fluid and that the composition has excellent coefficient of performance and refrigerating capacity.

Heretofore, a combination of HFO-1234yf and HFO-1123 has not been found or indicated in any documents yet, with a view to obtaining a working fluid which is practically useful comprehensively considering the balance of the capacity, the efficiency and the temperature glide as an alternative to R410A.

HFO-1123 is known to undergo so-called self-decomposition at high temperature or with an ignition source under high pressure. Therefore, an attempt to suppress self-decomposition reaction by mixing HFO-1123 with another component such as vinylidene fluoride to form a mixture having a lowered content of HFO-1123 has been reported (Non-Patent Document 1).

However, Non-Patent Document 1 failed to disclose a composition with which a working fluid can be used with durability while maintaining cycle performance of HFO-1123 without any special measures, under the temperature and pressure conditions under which HFO-1123 is used as the working fluid, and a method for stably producing it. In a case where HFO-1123 is used as a working fluid, a composition with which the working fluid does not undergo self-decomposition and a stable production method are necessary.

PRIOR ART DOCUMENTS

Patent Documents

Patent Document 1: WO2012/157764
Patent Document 2: JP-A-2012-505296

Non-Patent Document

Non-Patent Document 1: Combustion, Explosion, and Shock Waves, Vol. 42, No 2, pp. 140-143, 2006

DISCLOSURE OF INVENTION

Technical Problem

The present inventor has confirmed that the critical temperature of HFO-1123 is 59.2° C. Thus, it was found that as an alternative to conventionally used R410A, HFO-1123 has a low critical temperature and it can substitute working fluids only in a limited range. Further, even when various HFCs disclosed in Patent Document 1 are combined, sufficient coefficient of performance and refrigerating capacity cannot necessarily be achieved. The object of the present invention is to provide a working fluid for heat cycle which achieves not only the critical temperature but also sufficient cycle performance as an alternative to R410A simultaneously, a composition for a heat cycle system comprising the working fluid, and a heat cycle system employing the composition.

Further, the object of the present invention is to provide a working fluid for heat cycle with which practically sufficient cycle performance will be obtained while suppressing the influence over global warming, and which has high durability without any special measures, a composition for a heat cycle system comprising the working fluid, and a heat cycle system employing the composition.

Solution to Problem

Under these circumstances, the present inventor has accomplished the present invention by intentionally using HFO-1234yf having a low refrigerating capacity and further HFC-32 in combination with HFO-1123 to obtain a working fluid having a specific composition.

That is, the present invention provides a working fluid for heat cycle, a composition for a heat cycle system and a heat cycle system of the following [1] to [8].

[1] A working fluid for heat cycle, which contains HFO-1123, HFO-1234yf and HFC-32, wherein the proportion of the total amount of HFO-1123, HFO-1234yf and HFC-32 based on the entire amount of the working fluid is higher than 90 mass % and at most 100 mass %, and based on the total amount of HFO-1123, HFO-1234yf and HFC-32, the proportion of HFO-1123 is at least 10 mass % and less than 70 mass %, the proportion of HFO-1234yf is at most 50 mass %, and the proportion of HFC-32 is higher than 30 mass % and at most 75 mass %.

[2] The working fluid for heat cycle according to [1], wherein the proportion of HFC-32 based on the total amount of HFO-1123, HFO-1234yf and HFC-32 is higher than 30 mass % and at most 44 mass %.

[3] The working fluid for heat cycle according to [1] or [2], wherein based on the total amount of HFO-1123, HFO-1234yf and HFC-32, the proportion of HFO-1123 is at least 20 mass % and less than 70 mass %, and the proportion of HFO-1234yf is at most 40 mass %.

[4] The working fluid for heat cycle according to any one of [1] to [3], wherein based on the total amount of HFO-1123, HFO-1234yf and HFC-32, the proportion of HFO-1234yf is at least 5 mass % and at most 40 mass %.

[5] A composition for a heat cycle system, which comprises the working fluid for heat cycle as defined in any one [1] to [4] and a lubricating oil.

[6] A heat cycle system, which employs the composition for a heat cycle system as defined in [5].

[7] The heat cycle system according to [6], which is a refrigerating apparatus, an air-conditioning apparatus, a power generation system, a heat transport apparatus or a secondary cooling machine.

[8] The heat cycle system according to [6], which is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine or a vending machine.

Advantageous Effects of Invention

The working fluid for heat cycle and the composition for a heat cycle system containing the working fluid of the present invention have less influence over global warming and have practically sufficient cycle performance when used for heat cycle, and are excellent in durability.

The heat cycle system of the present invention, which employs the composition for a heat cycle system of the present invention, has less influence over global warming and has practically sufficient cycle performance, and is excellent in durability.

Further, the working fluid for heat cycle of the present invention has the above excellent properties and can replace conventionally used R410A.

DESCRIPTION OF EMBODIMENTS

Now, the present invention will be described in detail.
<Working Fluid for Heat Cycle>

The working fluid of the present invention is a working fluid for heat cycle, which contains HFO-1123, HFO-1234yf and HFC-32, wherein the proportion of the total amount of HFO-1123, HFO-1234yf and HFC-32 based on the entire amount of the working fluid is higher than 90 mass %, and at most 100 mass %, and based on the total amount of HFO-1123, HFO-1234yf and HFC-32, the proportion of HFO-1123 is at least 10 mass % and less than 70 mass %, the proportion of HFO-1234yf is at most 50 mass %, and the proportion of HFC-32 is higher than 30 mass % and at most 75 mass %.

As heat cycle, heat cycle by a heat exchanger such as a condenser or an evaporator may be used without any particular restriction.

The working fluid of the present invention, which contains HFO-1123, HFO-1234yf and HFC-32 within the above ranges, is a working fluid in a balanced manner which makes up for disadvantages of the respective compounds while making use of properties of the respective compounds. Specifically, it is a working fluid which has practically sufficient cycle performance as an alternative to conventional R410A, has a low global warming potential, and has no self-decomposition property.

Now, the composition of the working fluid according to an embodiment of the present invention will be described with reference to FIGS. 1 to 3.

Figure 1:
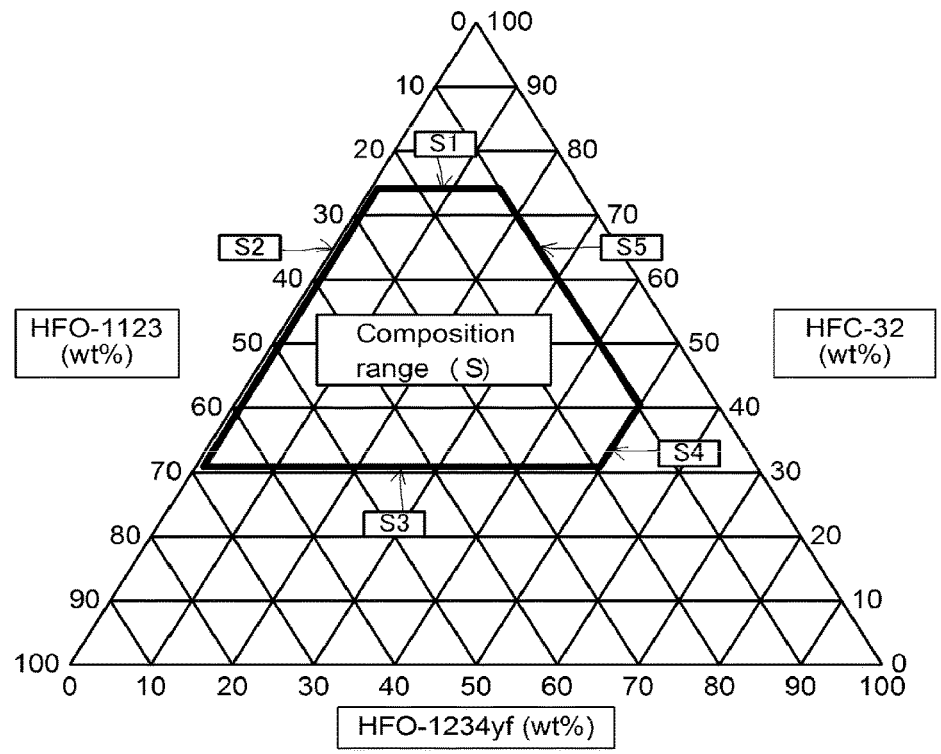
FIG. 1 is a diagram illustrating a composition range of an embodiment of a working fluid for heat cycle of the present invention in triangular coordinates of a composition (mass %) of a mixture of HFO-1123, HFO-1234yf and HFC-32.
Figure 2:
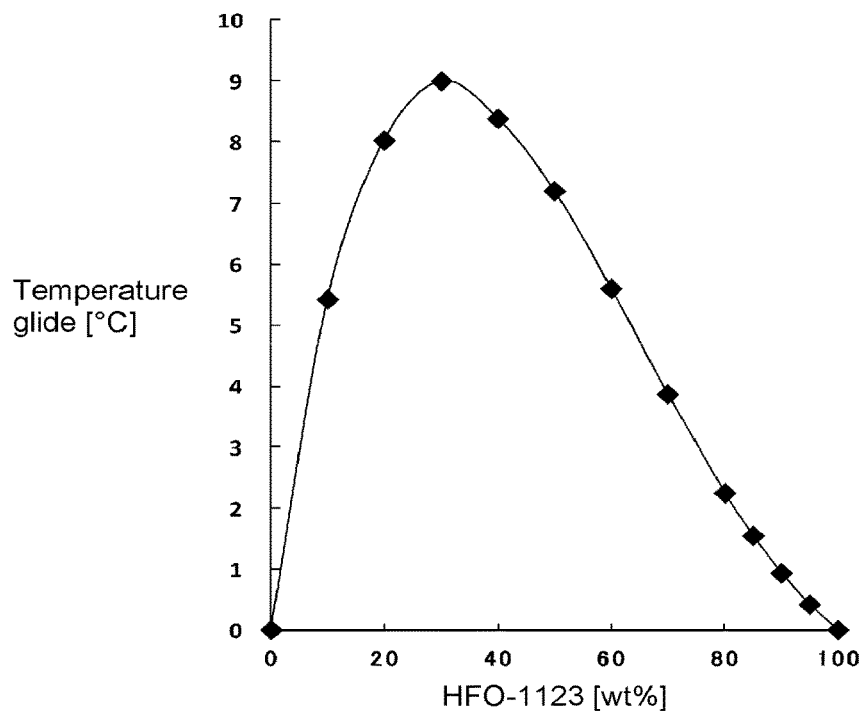
FIG. 2 is a graph showing the relation between the composition and the temperature glide of a mixed fluid of HFO-1123 and HFO-1234yf.

FIG. 1 illustrates the composition range in a case where the working fluid for heat cycle of the present invention comprises HFO-1123, HFO-1234yf and HFC-32 and contains no other component, that is, the composition range in a case where based on the total amount of HFO-1123, HFO-1234yf and HFC-32, the proportion of the HFO-1123 is at least 10 mass % and less than 70 mass %, the proportion of HFO-1234-yf is at most 50 mass %, and the proportion of HFC-32 is higher than 30 mass % and at most 75 mass % (hereinafter sometimes referred to as the composition range (S)). FIG. 1 illustrates triangular coordinates indicating the composition (mass %) of HFO-1123, HFO-1234yf and HFC-32 by the respective three sides, and a pentangular region surrounded by a heavy solid line corresponds to the composition range (S) of a working fluid according to an embodiment of the present invention.

The sides (S1) to (S5) of the pentagon indicating the composition range (S) in FIG. 1 respectively indicate boundaries of the following ranges. In the following formulae, abbreviated names of the respective compounds indicate the proportions (mass %) of the respective compounds based on the entire amount of the working fluid, that is, the total amount of HFO-1123, HFO-1234yf and HFC-32.

(S1) HFC-32≤75 mass %
(S2) 0 mass %<HFO-1234yf
(S3) 30 mass %<HFC-32
(S4) HFO-1234yf≤50 mass %
(S5) 10 mass %≤HFO-1123

Now, the relation between the composition range (S) and the performance as the working fluid, specifically, the global warming potential, the cycle performance, the temperature glide and the self-decomposition property will be described.
(Global Warming Potential (GWP))

In this specification, GWP is a value (100 years) in Intergovernmental Panel on Climate Change (IPCC), Fourth assessment report (2007), unless otherwise specified. Further, GWP of a mixture is represented by a weighted average by the composition mass.

GWPs of HFO-1234yf and HFC-32 contained in the working fluid of the present invention are 4 and 675, respectively, and the global warming potential (100 years) of HFO-1123 is 0.3 as a value measured in accordance with IPCC Fourth assessment report.

In the composition range (S) shown in FIG. 1 according to an embodiment of the working fluid of the present invention, the composition with highest GWP is the composition at the upper right angle of the pentagon, that is, the composition comprising HFO-1123:HFO-1234yf:HFC-32 of 10 mass %:15 mass %:75 mass %, and GWP with the composition is calculated as (0.3×10+4×15+675×75)/100=506.9. This is a value of at most ¼ as compared with GWP of R410A of 2087.5.

GWP of a mixture is a weighted average by the composition mass of each component as described above. Since GWPs of HFO-1123 and HFO-1234yf are very low as compared with GWP of HFC-32, GWP of a composition comprising HFO-1123, HFO-1234yf and HFC-32 greatly depends on the content of HFC-32.

Accordingly, in view of only GWP of the working fluid, in the triangular coordinates in FIG. 1, the closer to the lower side, the lower GWP of the composition and the more preferred. However, in the present invention, the lower side in the composition range (S) is limited to (S3) 30 mass %<HFC-32 considering the balance of the cycle performance, the temperature glide and the self-decomposition property as described hereinafter.

The working fluid of the present invention may contain an optional component other than HFO-1123, HFO-1234yf and HFC-32 in a proportion of at most 10 mass %. It is preferred that the working fluid does not contain, as an optional component, a component which excessively increases GWP of the working fluid. GWP of the working fluid of the present invention is preferably at most 500, more preferably at most 300.
(Cycle Performance)

The cycle performance of the working fluid may be a coefficient of performance and a refrigerating capacity.

The coefficient of performance and the refrigerating capacity of each of HFO-1123, HFO-1234yf and HFC-32 contained in the working fluid of the present invention, measured by the after-mentioned Examples, as relative values based on R410A (1.000) are shown in Table 1.

As evident from Table 1, although HFO-1123 has an excellent refrigerating capacity as a working fluid, it may not be sufficient in view of the coefficient of performance as compared with other HFOs. Further, when HFO-1123 is used alone, from the viewpoint of the critical temperature, sufficient refrigerating cycle performance may not be expected in some cases for an application in which R410A has been used.

HFO-1234yf is a HFO having the refrigerating capacity and the coefficient of performance as a working fluid in a balanced manner. Although the critical temperature (94.7° C.) of HFO-1234yf is high as compared with HFO-1123, its capacity when used alone is insufficient as compared with R410A.

Further, although HFC-32 is excellent in the coefficient of performance and the refrigerating capacity, its GWP is high as compared with HFO-1123 and HFO-1234yf. However, GWP of HFC-32 is remarkably low as compared with R410A.

TABLE 1

| Working fluid composition [mass %] | | | Relative performance (relative to R410A) | | |
|---|---|---|---|---|---|
| HFO-1123 | HFO-1234yf | HFC-32 | Relative coefficient of performance | Relative refrigerating capacity | GWP |
| Ex. 33 | 100 | 0 | 0 | 0.921 | 1.146 | 0.3 |
| Ex. 34 | 0 | 100 | 0 | 1.046 | 0.422 | 4.0 |
| Ex. 35 | 0 | 0 | 100 | 1.009 | 1.109 | 675.0 |

TABLE 1-continued

| | Working fluid composition [mass %] | | | Relative performance (relative to R410A) | | |
|---|---|---|---|---|---|---|
| | HFO-1123 | HFO-1234yf | HFC-32 | Relative coefficient of performance | Relative refrigerating capacity | GWP |
| Ex. 57 (R410A) | Working fluid comprising HFC-125 and HFC-32 in a mass ratio of 1:1 | | | 1.000 | 1.000 | 2087.5 |

Here, in the composition range (S) in FIG. 1 indicating the composition range of HFO-1123, HFO-1234yf and HFC-32 in the working fluid of the present invention, the composition with a coefficient of performance as a relative performance relative to R410A (hereinafter sometimes referred to as "relative coefficient of performance") being at least 1.000 is a composition at the side (S5) and in the vicinity thereof. Further, the composition with the minimum relative coefficient of performance is a composition at the lower left angle in the pentagon indicating the composition range (S).

Further, in the composition range (S) in FIG. 1, the composition with a refrigerating capacity as a relative performance relative to R410A (hereinafter sometimes referred to as "relative refrigerating capacity") being at least 1.000 is a composition at the side (S2) and in the vicinity thereof. Further, the composition with the minimum relative coefficient of performance is a composition at the rightmost angle in the pentagon indicating the composition range (S). The relative refrigerating capacity can be considered to greatly depend on the content of HFO-1234yf.

When the relative coefficient of performance and the relative refrigerating capacity are certain values or higher, and a product of the relative coefficient of performance and the relative refrigerating capacity as an index is a certain value or higher, such a working fluid can be considered to be in good balance of the cycle performance.

The working fluid preferably has a relative coefficient of performance of at least 0.958 and a relative refrigerating capacity of at least 0.820, more preferably a relative coefficient of performance of at least 0.980 and a relative refrigerating capacity of at least 0.950, particularly preferably a relative coefficient of performance of at least 1.000 and a relative refrigerating capacity of at least 1.000. From the viewpoint of the relative coefficient of performance, (S2) is preferably 5 mass %≤HFO-1234yf, more preferably 8 mass %≤HFO-1234yf. Further, with respect to the relation between the relative coefficient of performance and the relative refrigerating capacity, in a case where both the relative coefficient of performance and the relative refrigerating capacity are lower than 1.000, their product is preferably at least 0.950.

The working fluid of the present invention may contain an optional component other than HFO-1123, HFO-1234yf and HFC-32 in a proportion of at most 10 mass %. It is preferred that the working fluid of the present invention does not contain, as an optional component, a component which excessively decreases the relative coefficient of performance and the relative refrigerating capacity of the working fluid.
(Temperature Glide)

In a case where a mixture is used as the working fluid, it is preferably an azeotropic mixture or a pseudoazeotropic mixture such as R410A. A non-azeotropic mixture has a problem such that when it is put into a refrigerator or an air-conditioning apparatus from a pressure container, it undergoes a composition change. Further, if a refrigerant leaks out from a refrigerator or an air-conditioning apparatus, the refrigerant composition in the refrigerator or the air-conditioning apparatus is very likely to change, and a recovery to an initial refrigerant composition is hardly possible. Such problems can be avoided with an azeotropic or pseudoazeotropic mixture.

As an index to the above properties of a mixture as the working fluid, the following "temperature glide" is commonly employed. The temperature glide is defined as properties such that the initiation temperature and the completion temperature of evaporation in an evaporator or of condensation in a condenser, for example, as the heat exchanger, differ from each other. The temperature glide of an azeotropic mixture fluid is 0, and the temperature glide of a pseudoazeotropic mixture fluid, such as R410A, is extremely close to 0.

If the temperature glide is large, for example, the inlet temperature of an evaporator tends to be low, and frosting is likely to occur. Further, in a heat cycle system, the heat exchange efficiency is to be improved by making the working fluid and the heat source fluid such as water or the air flowing in heat exchangers flow in counter-current flow. Since the temperature difference of the heat source fluid is small in a stable operation state, it is difficult to obtain a heat cycle system with a good energy efficiency with a non-azeotropic mixture fluid with a large temperature glide. Accordingly, a non-azeotropic mixture fluid with an appropriate temperature glide is desired.

HFO-1123 and HFO-1234yf in the working fluid of the present invention are not in an azeotropic state. The relation between the temperature glide and the composition of a mixed fluid of HFO-1123 and HFO-1234yf measured by the method disclosed in after-mentioned Examples is shown in FIG. 2. Further, it was confirmed by the present inventor that HFO-1123 and HFC-32 are in the form of a pseudoazeotropic mixture close to an azeotropic mixture within a composition range of from 99:1 to 1:99 by mass ratio.

From the above relation, a mixture of HFO-1123, HFO-1234yf and HFC-32 is considered to have a temperature glide. Further, from the relation between HFO-1123 and HFO-1234yf and the relation between HFO-1123 and HFC-32, in the composition range (S) in FIG. 1 indicating the composition range of HFO-1123, HFO-1234yf and HFC-32 in the working fluid of the present invention, the following can be confirmed.

In the composition range (S) in FIG. 1, the closer to the side (S2), that is, the lower the content of HFO-1234yf, the closer to 0 the temperature glide is. Further, the temperature glide is smallest with a composition at the lower limit of (S2), that is, at the lower left angle in the pentagon indicating the composition range (S). On the other hand, the higher the content of HFO-1234yf, that is, the closer to the side (S4), the larger the temperature glide. Further, the temperature glide is largest with a composition at the lower limit of (S4), that is, at the lower right angle in the pentagon indicating the composition range (S).

Further, in Table 2, the composition, the temperature glide and GWP of a working fluid having a HFO-1234yf content of 50 mass % among working fluids prepared in Examples of the present invention and Comparative Examples, are shown. Further, for comparison, the temperature glide and GWP of a working fluid comprising HFO-1123 and HFO-1234yf in a mass ratio of 1:1 and R410A are shown.

TABLE 2

| | Working fluid composition [mass %] | | | Temperature glide [° C.] | GWP |
|---|---|---|---|---|---|
| | HFO-1123 | HFO-1234yf | HFC-32 | | |
| Ex. 5 | 10 | 50 | 40 | 5.8 | 272.0 |
| Ex. 30 | 20 | 50 | 30 | 6.6 | 204.6 |
| Ex. 27 | 30 | 50 | 20 | 7.1 | 137.1 |
| Ex. 19 | 40 | 50 | 10 | 7.3 | 69.6 |
| Ex. 36 | 50 | 50 | 0 | 7.2 | 2.2 |
| Ex. 57 (R410A) | Working fluid comprising HFC-125 and HFC-32 in a mass ratio of 1:1 | | | 0.2 | 2087.5 |

As evident from Table 2, even at the same content of HFO-1234yf being 50 mass %, the temperature glide is small when the content of HFC-32 is high, as compared with HFO-1123. Accordingly, as the working fluid of the present invention, for example, the composition range (S) which is a composition with low GWP and small temperature glide is selected in the triangular coordinates in FIG. 1.

In the composition range (S) in a case where the working fluid of the present invention comprises HFO-1123, HFO-1234yf and HFC-32, with reference to FIG. 1 and Table 2, the temperature glide is less than 6.6° C., which is a practically preferred range, as an alternative to R410A. The temperature glide of the working fluid comprising HFO-1123, HFO-1234yf and HFC-32 is more preferably less than 5.8° C.

Further, the working fluid of the present invention may contain an optional component other than HFO-1123, HFO-1234yf and HFC-32 in a proportion of at most 10 mass %. It is preferred that the working fluid of the present invention does not contain, as an optional component, a component which excessively increases the temperature glide of the working fluid. The temperature glide of the working fluid of the present invention is preferably at most 6° C., more preferably at most 5° C.

The influence in a heat cycle system when the working fluid of the present invention has a temperature glide will be described with reference to a case where the working fluid is used for a heat cycle system shown in FIG. 3. FIG. 3 is a schematic construction view illustrating a refrigerating cycle system as an example of a heat cycle system of the present invention.

A refrigerating cycle system 10 comprises a compressor 11 to compress a working fluid (vapor), a condenser 12 to cool and liquefy the working fluid vapor discharged from the compressor 11, an expansion valve 13 to let the working fluid (liquid) discharged from the condenser 12 expand, and an evaporator 14 to heat and vaporize the working fluid in a liquid state discharged from the expansion valve 13.

In the refrigerating cycle system 10, the temperature of the working fluid increases from an inlet toward an outlet of the evaporator 14 at the time of evaporation, and on the contrary, the temperature decreases from an inlet toward an outlet of the condenser 12 at the time of condensation. In the refrigerating cycle system 10, such is achieved by heat exchange between the working fluid and a heat source fluid such as water or the air flowing to face the working fluid in the evaporator 14 or the condenser 12. The heat source fluid is represented by E→E' in the evaporator 14 and by F→F' in the condenser 12 in the refrigerating cycle system 10.

Here, when a single fluid or an azeotropic mixture fluid is used, since there is no temperature glide, the temperature difference between the outlet temperature and the inlet temperature of the evaporator 14 is substantially constant, however, when a non-azeotropic mixture fluid is used, the temperature difference will not be constant. For example, in a case where the working fluid is to be evaporated at 0° C. in the evaporator 14, the inlet temperature is lower than 0° C., and frosting may occur in the evaporator 14. Particularly, the larger the temperature glide, the lower the inlet temperature and the more frosting is likely to occur.

Further, in a case where a non-azeotropic mixture fluid with a large temperature glide is used for the refrigerating cycle system 10, since the compositions of the gaseous phase and the liquid phase are significantly different from each other, if the non-azeotropic mixture fluid circulating in the system 10 leaks out, the composition of the non-azeotropic mixture fluid circulating in the system 10 may significantly change as between before and after the leakage.

Further, for example, as shown in the refrigerating cycle system 10, usually in the heat cycle system, the heat exchange efficiency is to be improved by making the working fluid and the heat source fluid such as water or the air flowing in heat exchangers such as the evaporator 14 and the condenser 12 flow in counter-current flow. Here, since the temperature difference of the heat source fluid is small usually in a long-term stable operation state except for at the time of start-up, it is difficult to obtain a heat cycle system with a good energy efficiency with a non-azeotropic mixture fluid with a large temperature glide. Accordingly, a non-azeotropic mixture fluid with an appropriate temperature glide is desired.

As described above, the composition range of the combination of HFO-1123, HFO-1234yf and HFC-32 in the working fluid of the present invention is a range within which the working fluid has a practical temperature glide.

(Self-Decomposition Property)

HFO-1123 contained in the working fluid of the present invention is known to have self-decomposition property. However, under the temperature and pressure conditions under which HFO-1123 is used as a working fluid, a composition with which the working fluid can be used with durability while maintaining refrigerating cycle performance of HFO-1123 has not been known. Accordingly, the present inventor has confirmed that self-decomposition can be suppressed under the temperature and pressure conditions under which a composition containing HFO-1123 is used as a working fluid, when the content of HFO-1123 based on the entire amount of the composition is at most 70 mol %.

<Evaluation of Self-Decomposition Property of HFO-1123>

The self-decomposition property was evaluated in equipment in accordance with method A recommended as equipment for measurement of the combustion range of a gas mixture containing halogen, by individual notifications in High Pressure Gas Safety Act.

Specifically, a mixed fluid of HFO-1123 and HFO-1234yf, HFO-1123 and HFC-32, or HFO-1123, HFO-1234yf and HFC-32, in various proportions, is enclosed in a spherical pressure resistant reactor having an internal capacity of 650 cm$^3$ and having a predetermined temperature controlled from the outside to a predetermined pressure, and then a platinum wire disposed in the interior was fused to apply an energy of about 30 J. Whether the self-decomposition reaction occurred or not was confirmed by measuring the temperature and pressure changes in the pressure resistant reactor after the application. A case where a pressure increase and a temperature increase were confirmed was evaluated as self-decomposition reaction occurred. The results are shown in Table 3 with respect to mixed fluids of HFO-1123 and HFO-1234yf, in Table 4 with respect to mixed fluids of HFO-1123 and HFC-32, and in Table 5 with respect to mixed fluids of HFO-1123, HFO-1234yf and HFC-32. The pressure in Tables 3 to 5 is the gage pressure.

TABLE 3

| HFO-1123/HFO-1234yf | | Pressure [MPaG] | | Temperature [° C.] | | Self-decomposition reaction |
|---|---|---|---|---|---|---|
| [mass %/mass %] | [mol %/mol %] | Before ignition | After ignition | Before ignition | After ignition | |
| 52/48 | 60/40 | 0.98 | 0.98 | 250 | 250.2 | Nil |
| 63/37 | 70/30 | 0.98 | 0.98 | 250 | 250.2 | Nil |
| 74/26 | 80/20 | 0.98 | 4.00 | 250 | 291.6 | Occurred |
| 87/13 | 90/10 | 0.98 | 4.80 | 250 | 291.1 | Occurred |

TABLE 4

| HFO-1123/HFC-32 | | Pressure [MPaG] | | Temperature [° C.] | | Self-decomposition reaction |
|---|---|---|---|---|---|---|
| [mass %/mass %] | [mol %/mol %] | Before ignition | After ignition | Before ignition | After ignition | |
| 70/30 | 60/40 | 0.98 | 0.98 | 250 | 250.5 | Nil |
| 80/20 | 72/28 | 0.98 | 0.98 | 250 | 250.4 | Nil |
| 85/15 | 78/22 | 0.98 | 4.60 | 250 | 290.0 | Occurred |

TABLE 5

| HFO-1123/HFO-1234yf/HFC-32 | | Pressure [MPaG] | | Temperature [° C.] | | Self-decomposition reaction |
|---|---|---|---|---|---|---|
| [mass %/mass %/mass %] | [mol %/mol %/mol %] | Before ignition | After ignition | Before ignition | After ignition | |
| 70/10/20 | 64/7/29 | 0.98 | 0.98 | 250 | 250.5 | Nil |
| 70/20/10 | 70/14/16 | 0.98 | 0.98 | 250 | 250.5 | Nil |
| 80/10/10 | 78/7/15 | 0.98 | 4.00 | 250 | 289.5 | Occurred |

The composition range (S) of the working fluid according to an embodiment of the present invention does not contain a composition range with self-decomposition property thus confirmed. That is, when the working fluid of the present invention is a working fluid within the above composition range (S) consisting solely of HFO-1123, HFO-1234yf and HFC-32, the content of HFO-1123 based on the entire amount of the working fluid is at most 70 mol %.

The working fluid of the present invention may contain an optional component other than HFO-1123, HFO-1234yf and HFC-32 in a proportion of at most 10 mass %. As the optional component, a compound having no self-decomposition property is preferably selected.

The working fluid in the composition range (S) is a working fluid having respective characteristics of HFO-1123, HFO-1234yf and HFC-32 in a balanced manner, and having defects of the respective components suppressed. That is, the working fluid in the composition range (S) is a working fluid which has a low GWP, has durability secured, and has a small temperature glide and has a certain performance and efficiency when used for heat cycle, and thus with such a working fluid, favorable cycle performance will be obtained.

In a case where the working fluid of the present invention is consists solely of three compounds of HFO-1123, HFO-1234yf and HFC-32, a preferred composition may be a composition such that based on the total amount of HFO-1123, HFO-1234yf and HFC-32, the proportion of HFO-1123 is at least 10 mass % and less than 70 mass %, the proportion of HFO-1234yf is at most 50 mass %, and the proportion of HFC-32 is higher than 30 mass % and at most 44 mass %. This composition range will be described below as the composition range (P).

Figure 4:
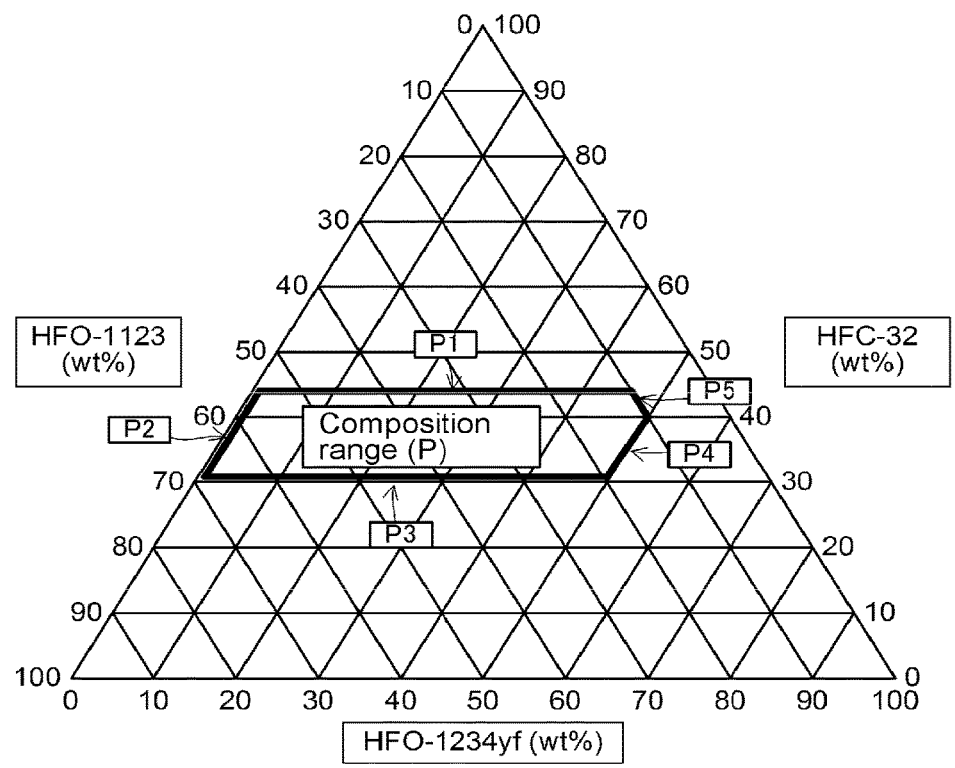
FIG. 4 is a diagram illustrating a preferred composition range of an embodiment of a working fluid for heat cycle of the present invention in triangular coordinates of a composition (mass %) of a mixture of HFO-1123, HFO-1234yf and HFC-32.

The composition range (P) in a case where the working fluid for heat cycle of the present invention comprises HFO-1123, HFO-1234yf and HFC-32 is shown in triangular coordinates in FIG. 4. That is, FIG. 4 illustrates triangular coordinates indicating the composition (mass %) of HFO-1123, HFO-1234yf and HFC-32 by the respective three sides, and a band-form pentangular region surrounded by a heavy solid line substantially at the center portion of the triangular coordinates, corresponds to the composition range (P) of a preferred working fluid of the present invention.

The sides (P1) to (P5) of the pentagon indicating the composition range (P) in FIG. 4 respectively indicate boundaries of the following ranges. In the following formulae, abbreviated names of the respective compounds indicate the proportions (mass %) of the respective compounds based on the entire amount of the working fluid, that is, the total amount of HFO-1123, HFO-1234yf and HFC-32, in the same manner as the above (S1) to (S5).

(P1) HFC-32≤44 mass %
(P2) 0 mass %<HFO-1234yf
(P3) 30 mass %<HFC-32
(P4) HFO-1234yf≤50 mass %
(P5) 10 mass %≤HFO-1123

Of the above (P1) to (P5) in the composition range (P), (P2) to (P5) are the same as (S2) to (S5) in the composition range (S). In the composition range (P), the upper limit content of HFC-32 is lower and the upper limit of GWP is lower than in the composition range (S). In the composition range (P) shown in FIG. 4, the composition with highest GWP is the composition at the upper right angle of the pentagon, that is, the composition comprising HFO-1123: HFO-1234yf:HFC-32 of 10 mass %:46 mass %:44 mass %, and GWP with the composition is calculated as $(0.3 \times 10 + 4 \times 46 + 675 \times 44)/100 = 298.9$. In view of a high relative coefficient of performance, (P2) is preferably 5 mass %≤HFO-1234yf, more preferably 8 mass %≤HFO-1234yf.

Further, in a case where the working fluid of the present invention is constituted of three compounds of HFO-1123, HFO-1234yf and HFC-32, another preferred composition may be a composition in which based on the total amount of HFO-1123, HFO-1234yf and HFC-32, the proportion of HFO-1123 is at least 20 mass % and less than 70 mass %, the proportion of HFO-1234yf is at most 40 mass %, and the proportion of HFC-32 is higher than 30 mass % and at most 75 mass %. More preferred is such a composition wherein the upper limit of the proportion of HFC-32 is 44 mass %. Further preferred is such a composition wherein the lower limit of the proportion of HFO-1234yf is 5 mass %. The further preferred composition range will be described below as the composition range (M).

Figure 5:
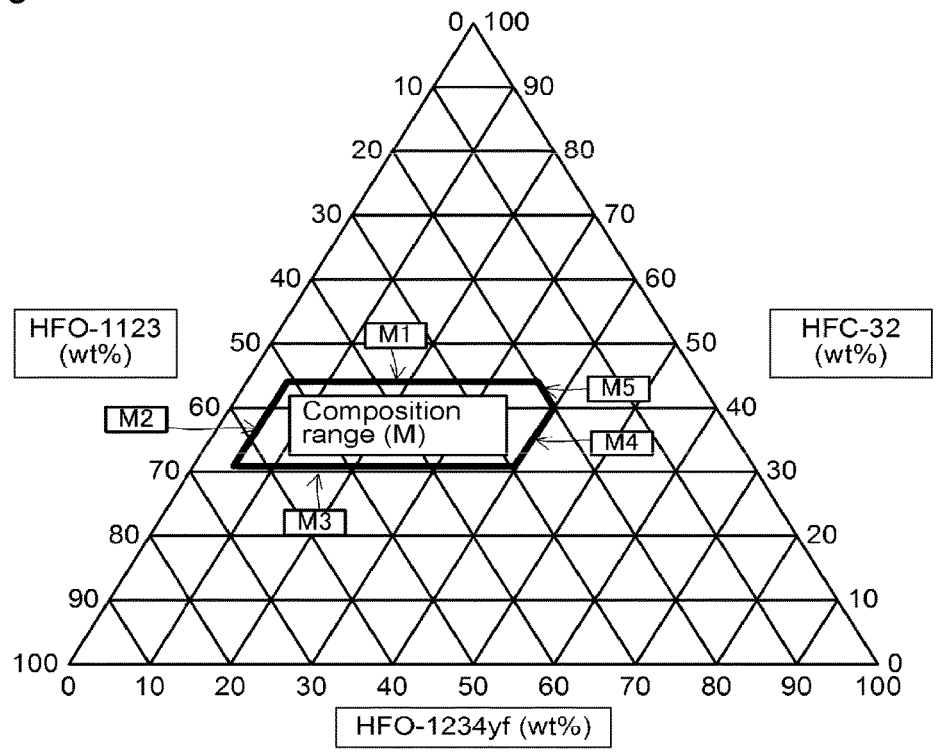
FIG. 5 is a diagram illustrating a more preferred composition range of an embodiment of a working fluid for heat cycle of the present invention in triangular coordinates of a composition (mass %) of a mixture of HFO-1123, HFO-1234yf and HFC-32.

The composition range (M) in a case where the working fluid for heat cycle of the present invention comprises HFO-1123, HFO-1234yf and HFC-32 is shown in triangular coordinates in FIG. 5. That is, FIG. 5 illustrates triangular coordinates indicating the composition (mass %) of HFO-1123, HFO-1234yf and HFC-32 by the respective three sides, and a pentangular region surrounded by a heavy solid line at the left side substantially at the center portion of the triangular coordinates, corresponds to the composition range (M) of the further preferred working fluid of the present invention.

The sides (M1) to (M5) of the pentagon indicating the composition range (M) in FIG. 5 respectively indicate boundaries of the following ranges. In the following formulae, abbreviated names of the respective compounds indicate the proportions (mass %) of the respective compounds based on the entire amount of the working fluid, that is, the total amount of HFO-1123, HFO-1234yf and HFC-32, in the same manner as the above (S1) to (S5).

(M1) HFC-32≤44 mass %
(M2) 5 mass %≤HFO-1234yf
(M3) 30 mass %<HFC-32
(M4) HFO-1234yf≤40 mass %
(M5) 20 mass %≤HFO-1123

Of the above (M1) to (M5) in the composition range (M), (M1) and (M3) are the same as (P1) and (P3) in the composition range (P). In the composition range (M), as compared with the composition range (P), the range of the HFO-1234yf content is narrowed from "higher than 0 mass % and at most 50 mass %" to "at least 5 mass % and at most 40 mass %", and the lower limit of the HFO-1123 content was increased from 10 mass % to 20 mass %. Within such a range, the upper limit of the temperature glide is lowered, and the lower limit of the product of the relative coefficient of performance and the relative refrigerating capacity is increased. In view of a high relative coefficient of performance, (M2) is more preferably 8 mass %≤HFO-1234yf. Further, in view of a high relative refrigerating capacity, (M4) is more preferably HFO-1234yf≤35 mass %.

The working fluid in the composition range (M) is a working fluid having respective characteristics of HFO-1123, HFO-1234yf and HFC-32 in a balanced manner, and having defects of the respective components suppressed. That is, the working fluid in the composition range (M) is a working fluid of which the upper limit of GWP is suppressed to be so low as at most 300, which has durability secured, and which has a small temperature glide of less than 5.8 and has a relative coefficient of performance and a relative refrigerating capacity close to 1, when used for heat cycle, and thus with such a working fluid, favorable cycle performance will be obtained.

[Optional Component]

The working fluid of the present invention may optionally contain a compound commonly used for a working fluid, in a proportion of at most 10 mass % based on the entire amount of the working fluid, in addition to HFO-1123, HFO-1234yf and HFC-32, within a range not to impair effects of the present invention. Even when the working fluid of the present invention contains an optional compound in addition to HFO-1123, HFO-1234yf and HFC-32 (which will be referred to as an optional component), the temperature glide of the working fluid will not be 0 and the working fluid has a considerable temperature glide. The temperature glide of the working fluid of the present invention varies depending upon the mixture ratio of HFO-1123, HFO-1234yf and HFO-1234yf and the optional component contained as the case requires.

The optional component includes a HFC other than HFC-32 or a HFO (a HFC having a carbon-carbon double bond) other than HFO-1123 and HFO-1234yf.

(HFC Other Than HFC-32)

As the HFC other than HFC-32 which the working fluid of the present invention may optionally contain, for example, a HFC having an effect to decrease the temperature glide, to improve the capacity or to further increase the efficiency, when used in combination with HFO-1123, HFO-1234yf and HFC-32 for heat cycle, is used. When the working fluid of the present invention contains such a HFC other than HFC-32, more favorable cycle performance will be obtained.

A HFC is known to have a high GWP as compared with HFO-1123 and HFO-1234yf. Accordingly, a HFC as the optional component is selected with a view to adjusting the GWP within an acceptable range, in addition to improving cycle performance as the working fluid.

A HFC as an optional component, which has less influence over the ozone layer and which has less influence over global warming, is specifically preferably a $C_{1-5}$ HFC. The HFC other than HFC-32 may be linear, branched or cyclic.

The HFC other than HFC-32 may, for example, be difluoroethane, trifluoroethane, tetrafluoroethane, pentafluoroethane (HFC-125), pentafluoropropane, hexafluoropropane, heptafluoropropane, pentafluorobutane or heptafluorocyclopentane.

Particularly, in view of less influence over the ozone layer and excellent refrigerating cycle performance, the HFC other than HFC-32 is preferably 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) or HFC-125, more preferably HFC-134a or HFC-125.

However, HFC-134a and HFC-125 have very high global warming potentials of 1,430 and 3,500, respectively. When they are used as optional components of the working fluid, they are incorporated so that GWP of the working fluid will not exceed the acceptable range.

The HFC other than HFC-32 may be used alone or in combination of two or more.

(HFO other than HFO-1123 and HFO-1234yf)

The HFO other than HFO-1123 and HFO-1234yf may, for example, be 1,2-difluoroethylene (HFO-1132), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), trans-1,3,3,3-tetrafluoropropene (HFO-1234ze(E)), cis-1,3,3,3-tetrafluoropropene (HFO-1234ze(Z)) or 3,3,3-trifluoropropene (HFO-1243zf).

Particularly, the HFO other than HFO-1123 and HFO-1234yf is, in view of a high critical temperature and excellent durability and coefficient of performance, preferably HFO-1234ze(E) or HFO-1234ze(Z), more preferably HFO-1234ze(E).

The HFO other than HFO-1123 and HFO-1234yf may be used alone or in combination of two or more.

In a case where the working fluid of the present invention contains the optional component, its content is at most 10 mass %, preferably at most 8 mass %.

The content of the optional component is properly adjusted within the above range, with a view to lowering the temperature glide, improving the capacity or further increasing the efficiency, while durability is secured, and further considering the global warming potential, when the working fluid of the present invention is used for heat cycle.

The composition range by HFO-1123, HFO-1234yf and HFC-32 in the working fluid of the present invention is a composition range in which the balance of the durability, the temperature glide, the refrigerating capacity, the coefficient of performance and the global warming potential is adjusted by the three components alone, and accordingly an improvement of any of such characteristics without disturbing the balance by addition of an optional component may be difficult in some cases. Particularly when the working fluid is in the above preferred composition range, such improvement is difficult. Accordingly, the working fluid of the present invention preferably contains no other component than HFO-1123, HFO-1234yf and HFC-32 except for the following other optional component incorporated for the purpose of improving the solubility in a lubricating oil or imparting flame retardancy.

(Other Optional Component)

The working fluid of the present invention may contain, other than the above optional component, carbon dioxide, a hydrocarbon, a chlorofluoroolefin (CFO), a hydrochlorofluoroolefin (HCFO), etc. Such another optional component is preferably a component which has less influence over the ozone layer and which has less influence over global warming.

The hydrocarbon may, for example, be propane, propylene, cyclopropane, butane, isobutane, pentane or isopentane.

The hydrocarbon may be used alone or in combination of two or more.

In a case where the working fluid of the present invention contains a hydrocarbon, its content is at most 10 mass %, preferably from 1 to 5 mass %, more preferably from 3 to 5 mass % per 100 mass % of the working fluid. When the content of the hydrocarbon is at least the lower limit, the solubility of a mineral lubricating oil in the working fluid will be favorable.

The CFO may, for example, be chlorofluoropropene or chlorofluoroethylene. With a view to suppressing flammability of the working fluid without significantly decreasing the cycle performance of the working fluid of the present invention, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

When the working fluid of the present invention contains the CFO, its content is at most 10 mass %, preferably from 1 to 8 mass %, more preferably from 2 to 5 mass % per 100 mass % of the working fluid. When the content of the CFO is at least the lower limit, the flammability of the working fluid tends to be suppressed. When the content of the CFO is at most the upper limit, favorable cycle performance is likely to be obtained.

The HCFO may, for example, be hydrochlorofluoropropene or hydrochlorofluoroethylene. With a view to suppressing the flammability of the working fluid without significantly decreasing the cycle performance of the working fluid of the present invention, the HCFO is preferably 1-chloro-2,3,3,3-tetrafluoropropene (HCFO-1224yd) or 1-chloro-1,2-difluoroethylene (HCFO-1122).

The HCFO may be used alone or in combination of two or more.

In a case where the working fluid of the present invention contains the HCFO, the content of the HCFO per 100 mass % of the working fluid of the present invention is at most 1 mass %, preferably from 1 to 8 mass %, more preferably from 2 to 5 mass %. When the content of the HCFO is at least the lower limit, the flammability of the working fluid tends to be suppressed. When the content of the HCFO is at most the upper limit, favorable cycle performance is likely to be obtained.

When the working fluid of the present invention contains the above optional component, the total content of such optional components in the working fluid is at most 10 mass %, preferably at most 8 mass %, more preferably at most 5 mass % per 100 mass % of the working fluid.

The working fluid of the present invention is a working fluid obtained by mixing HFO-1123 which is excellent in the performance as the working fluid and HFO-1234yf which has the capacity and the efficiency as the working fluid in a balanced manner, which are both HFOs having less influence over global warming, and HFC-32 which has a relatively high but remarkably low GWP than R410A which is excellent in the coefficient of performance and the refrigerating capacity, and which forms an azeotropic or pseudo-azeotropic composition with HFO-1123, in combination in such a proportion as to improve the cycle performance as compared with a case where they are respectively used alone, considering the temperature glide in a mixed fluid of the three, and the working fluid of the present invention has practically sufficient cycle performance while suppressing the influence over durability and global warming.

[Application to Heat Cycle System]

<Composition for Heat Cycle System>

The working fluid of the present invention may be used, in application to a heat cycle system, as the composition for a heat cycle system of the present invention usually as mixed with a lubricating oil. The composition for a heat cycle system of the present invention comprising the working fluid of the present invention and a lubricating oil may further contain known additives such as a stabilizer and a leak detecting substance.

(Lubricating Oil)

As a lubricating oil, a known lubricating oil which has been used for the composition for a heat cycle system together with a working fluid comprising a halogenated hydrocarbon may be used without any particular restrictions.

The lubricating oil may, for example, be specifically an oxygen-containing synthetic oil (such as an ester lubricating oil or an ether lubricating oil), a fluorinated lubricating oil, a mineral lubricating oil or a hydrocarbon synthetic oil.

The ester lubricating oil may, for example, be a dibasic acid ester oil, a polyol ester oil, a complex ester oil or a polyol carbonate oil.

The dibasic acid ester oil is preferably an ester of a $C_{5-10}$ dibasic acid (such as glutaric acid, adipic acid, pimelic acid, suberic acid, azelaic acid or sebacic acid) with a $C_{1-15}$ monohydric alcohol which is linear or has a branched alkyl group (such as methanol, ethanol, propanol, butanol, pentanol, hexanol, heptanol, octanol, nonanol, decanol, undecanol, dodecanol, tridecanol, tetradecanol or pentadecanol). Specifically, ditridecyl glutarate, di(2-ethylhexyl) adipate, diisodecyl adipate, ditridecyl adipate or di(3-ethylhexyl) sebacate may, for example, be mentioned.

The polyol ester oil is preferably an ester of a diol (such as ethylene glycol, 1,3-propanediol, propylene glycol, 1,4-butanediol, 1,2-butandiol, 1,5-pentadiol, neopentyl glycol, 1,7-heptanediol or 1,12-dodecanediol) or a polyol having from 3 to 20 hydroxy groups (such as trimethylolethane, trimethylolpropane, trimethylolbutane, pentaerythritol, glycerol, sorbitol, sorbitan or sorbitol/glycerin condensate) with a $C_{6-20}$ fatty acid (such as a linear or branched fatty acid such as hexanoic acid, heptanoic acid, octanoic acid, nonanoic acid, decanoic acid, undecanoic acid, dodecanoic acid, eicosanoic acid or oleic acid, or a so-called neo acid having a quaternary a carbon atom).

The polyol ester oil may have a free hydroxy group.

The polyol ester oil is preferably an ester (such as trimethylolpropane tripelargonate, pentaerythritol 2-ethylhexanoate or pentaerythritol tetrapelargonate) of a hindered alcohol (such as neopentyl glycol, trimethylolethane, trimethylolpropane, trimethylolbutane or pentaerythritol).

The complex ester oil is an ester of a fatty acid and a dibasic acid, with a monohydric alcohol and a polyol. The fatty acid, the dibasic acid, the monohydric alcohol and the polyol may be as defined above.

The polyol carbonate oil is an ester of carbonic acid with a polyol.

The polyol may be the above-described diol or the above-described polyol. Further, the polyol carbonate oil may be a ring-opening polymer of a cyclic alkylene carbonate.

The ether lubricating oil may be a polyvinyl ether oil or a polyoxyalkylene oil.

The polyvinyl ether oil may be one obtained by polymerizing a vinyl ether monomer such as an alkyl vinyl ether, or a copolymer obtained by copolymerizing a vinyl ether monomer and a hydrocarbon monomer having an olefinic double bond.

The vinyl ether monomer may be used alone or in combination of two or more.

The hydrocarbon monomer having an olefinic double bond may, for example, be ethylene, propylene, various forms of butene, various forms of pentene, various forms of hexene, various forms of heptene, various forms of octene, diisobutylene, triisobutylene, styrene, α-methylstyrene or alkyl-substituted styrene. The hydrocarbon monomer having an olefinic double bond may be used alone or in combination of two or more.

The polyvinyl ether copolymer may be either of a block copolymer and a random copolymer. The polyvinyl ether oil may be used alone or in combination of two or more.

The polyoxyalkylene oil may, for example, be a polyoxyalkylene monool, a polyoxyalkylene polyol, an alkyl ether of a polyoxyalkylene monool or a polyoxyalkylene polyol, or an ester of a polyoxyalkylene monool or a polyoxyalkylene polyol.

The polyoxyalkylene monool or the polyoxyalkylene polyol may be one obtained by e.g. a method of subjecting a $C_{2-4}$ alkylene oxide (such as ethylene oxide or propylene oxide) to ring-opening addition polymerization to an initiator such as water or a hydroxy group-containing compound in the presence of a catalyst such as an alkali hydroxide. Further, one molecule of the polyoxyalkylene chain may contain single oxyalkylene units or two or more types of oxyalkylene units. It is preferred that at least oxypropylene units are contained in one molecule.

The initiator to be used for the reaction may, for example, be water, a monohydric alcohol such as methanol or butanol, or a polyhydric alcohol such as ethylene glycol, propylene glycol, pentaerythritol or glycerol.

The polyoxyalkylene oil is preferably an alkyl ether or an ester of a polyoxyalkylene monool or polyoxyalkylene polyol. Further, the polyoxyalkylene polyol is preferably a polyoxyalkylene glycol. Particularly preferred is an alkyl ether of a polyoxyalkylene glycol having the terminal hydroxy group of the polyoxyalkylene glycol capped with an alkyl group such as a methyl group, which is called a polyglycol oil.

The fluorinated lubricating oil may, for example, be a compound having hydrogen atoms of a synthetic oil (such as the after-mentioned mineral oil, poly-α-olefin, alkylbenzene or alkylnaphthalene) substituted by fluorine atoms, a perfluoropolyether oil or a fluorinated silicone oil.

The mineral lubricating oil may, for example, be a naphthene mineral oil or a paraffin mineral oil obtained by purifying a lubricating oil fraction obtained by atmospheric distillation or vacuum distillation of crude oil by a purification treatment (such as solvent deasphalting, solvent extraction, hydrocracking, solvent dewaxing, catalytic dewaxing, hydrotreating or clay treatment) optionally in combination.

The hydrocarbon synthetic oil may, for example, be a poly-α-olefin, an alkylbenzene or an alkylnaphthalene.

The lubricating oil may be used alone or in combination of two or more.

The lubricating oil is preferably at least one member selected from a polyol ester oil, a polyvinyl ether oil and a polyglycol oil in view of compatibility with the working fluid.

The amount of the lubricating oil is not limited within a range not to remarkably decrease the effects of the present invention, and is preferably from 10 to 100 parts by mass, more preferably from 20 to 50 parts by mass, per 100 parts by mass of the working fluid.

(Stabilizer)

The stabilizer is a component which improves the stability of the working fluid against heat and oxidation. As the stabilizer, a known stabilizer which has been used for a heat cycle system together with a working fluid comprising a halogenated hydrocarbon, for example, an oxidation resistance-improving agent, a heat resistance-improving agent or a metal deactivator, may be used without any particular restrictions.

The oxidation resistance-improving agent and the heat resistance-improving agent may, for example, be N,N'-diphenylphenylenediamine, p-octyldiphenylamine, p,p'-dioctyldiphenylamine, N-phenyl-1-naphthyamine, N-phenyl-2-naphthylamine, N-(p-dodecyl) phenyl-2-naphthylamine, di-1-naphthylamine, di-2-naphthylamine, N-alkylphenothiazine, 6-(t-butyl)phenol, 2,6-di-(t-butyl)phenol, 4-methyl-2, 6-di-(t-butyl) phenol or 4,4'-methylenebis(2,6-di-t-butylphenol). Each of the oxidation resistance-improving agent and the heat resistance-improving agent may be used alone or in combination of two or more.

The metal deactivator may, for example, be imidazole, benzimidazole, 2-mercaptobenzothiazole, 2,5-dimercaptothiadiazole, salicylidene-propylenediamine, pyrazole, benzotriazole, tritriazole, 2-methylbenzamidazole, 3,5-dimethylpyrazole, methylenebis-benzotriazole, an organic acid or an ester thereof, a primary, secondary or tertiary aliphatic amine, an amine salt of an organic acid or inorganic acid, a heterocyclic nitrogen-containing compound, an amine salt of an alkyl phosphate, or a derivative thereof.

The amount of the stabilizer is not limited within a range not to remarkably decrease the effects of the present invention, and is preferably at most 5 parts by mass, more preferably at most 1 part by mass per 100 parts by mass of the working fluid.

(Leak Detecting Substance)

The leak detecting substance may, for example, be an ultraviolet fluorescent dye, an odor gas or an odor masking agent.

The ultraviolet fluorescent dye may be known ultraviolet fluorescent dyes which have been used for a heat cycle system together with a working fluid comprising a halogenated hydrocarbon, such as dyes as disclosed in e.g. U.S. Pat. No. 4,249,412, JP-A-10-502737, JP-A-2007-511645, JP-A-2008-500437 and JP-A-2008-531836.

The odor masking agent may be known perfumes which have been used for a heat cycle system together with a working fluid comprising a halogenated hydrocarbon, such as perfumes as disclosed in e.g. JP-A-2008-500437 and JP-A-2008-531836.

In a case where the leak detecting substance is used, a solubilizing agent which improves the solubility of the leak detecting substance in the working fluid may be used. The solubilizing agent may be ones as disclosed in e.g. JP-A-2007-511645, JP-A-2008-500437 and JP-A-2008-531836.

The amount of the leak detecting substance is not particularly limited within a range not to remarkably decrease the effects of the present invention, and is preferably at most 2 parts by mass, more preferably at most 0.5 part by mass per 100 parts by mass of the working fluid.

<Heat Cycle System>

The heat cycle system of the present invention is a system employing the working fluid of the present invention. When the working fluid of the present invention is applied to a heat cycle system, usually the working fluid is applied as contained in the composition for a heat cycle system. The heat cycle system of the present invention may be a heat pump system utilizing heat obtained by a condenser or may be a refrigerating cycle system utilizing coldness obtained by an evaporator.

The heat cycle system of the present invention may, for example, be specifically a refrigerator, an air-conditioning apparatus, a power generation system, a heat transfer apparatus and a secondary cooling machine. Among them, the heat cycle system of the present invention, which stably exhibits heat cycle performance in a working environment at higher temperature, is preferably employed as an air-conditioning apparatus to be disposed outdoors in many cases. Further, the heat cycle system of the present invention is preferably employed also for a refrigerating system.

The air-conditioning apparatus may, for example, be specifically a room air-conditioner, a package air-conditioner (such as a store package air-conditioner, a building package air-conditioner or a plant package air-condition, a gas engine heat pump, a train air-conditioning system or an automobile air-conditioning system.

The refrigerator may, for example, be specifically a showcase (such as a built-in showcase or a separate showcase), an industrial fridge freezer, a vending machine or an ice making machine.

The power generation system is preferably a power generation system by Rankine cycle system.

The power generation system may, for example, be specifically a system wherein in an evaporator, a working fluid is heated by e.g. geothermal energy, solar heat or waste heat in a medium-to-high temperature range at a level of from 50 to 200° C., and the vaporized working fluid in a high temperature and high pressure state is adiabatically expanded by an expansion device, so that a power generator is driven by the work generated by the adiabatic expansion to carry out power generation.

Further, the heat cycle system of the present invention may be a heat transport apparatus. The heat transport apparatus is preferably a latent heat transport apparatus.

The latent heat transport apparatus may, for example, be a heat pipe conducting latent heat transport utilizing evaporation, boiling, condensation, etc. of a working fluid filled in an apparatus, and a two-phase closed thermosiphon. A heat pipe is applied to a relatively small-sized cooling apparatus such as a cooling apparatus of a heating portion of a semiconductor device and electronic equipment. A two-phase closed thermosiphon is widely used for a gas/gas heat exchanger, to accelerate snow melting and to prevent freezing of roads, since it does not require a wick and its structure is simple.

Figure 3:
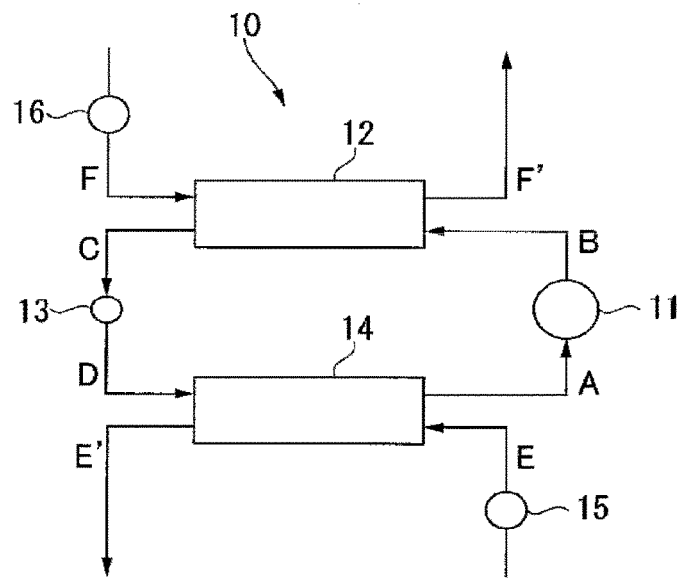
FIG. 3 is a schematic construction view illustrating a refrigerating cycle system as an example of a heat cycle system of the present invention.

Now, as an example of the heat cycle system according the embodiment of the present invention, a refrigerating cycle system will be described with reference to a refrigerating cycle system 10 which has been roughly described above, of which the schematic construction view is shown in FIG. 3, as an example. A refrigerating cycle system is a system utilizing coldness obtained by an evaporator.

A refrigerating cycle system 10 shown in FIG. 3 is a system generally comprising a compressor 11 to compress a working fluid vapor A to form a high temperature/high pressure working fluid vapor B, a condenser 12 to cool and liquefy the working fluid vapor B discharged from the compressor 11 to form a low temperature/high pressure working fluid C, an expansion valve 13 to let the working fluid C discharged from the condenser 12 expand to form a low temperature/low pressure working fluid D, an evaporator 14 to heat the working fluid D discharged from the expansion valve 13 to form a high temperature/low pressure working fluid vapor A, a pump 15 to supply a load fluid E to the evaporator 14, and a pump 16 to supply a fluid F to the condenser 12.

In the refrigerating cycle system 10, a cycle of the following (i) to (iv) is repeated.

(i) A working fluid vapor A discharged from an evaporator 14 is compressed by a compressor 11 to form a high temperature/high pressure working fluid vapor B (hereinafter referred to as "AB process").

(ii) The working fluid vapor B discharged from the compressor 11 is cooled and liquefied by a fluid F in a condenser 12 to form a low temperature/high pressure working fluid C. At that time, the fluid F is heated to form a fluid F', which is discharged from the condenser 12 (hereinafter referred to as "BC process").

(iii) The working fluid C discharged from the condenser 12 is expanded in an expansion valve 13 to form a low temperature/low pressure working fluid D (hereinafter referred to as "CD process").

(iv) The working fluid D discharged from the expansion valve 13 is heated by a load fluid E in the evaporator 14 to form a high temperature/low pressure working fluid vapor A. At that time, the load fluid E is cooled and becomes a load fluid E', which is discharged from the evaporator 14 (hereinafter referred to as "DA process").

The refrigerating cycle system 10 is a cycle system comprising an adiabatic isentropic change, an isenthalpic change and an isobaric change. The state change of the working fluid, as represented on a pressure enthalpy chart (curve) as shown in FIG. 6, may be represented as a trapezoid having points A, B, C and D as vertexes.

Figure 6:
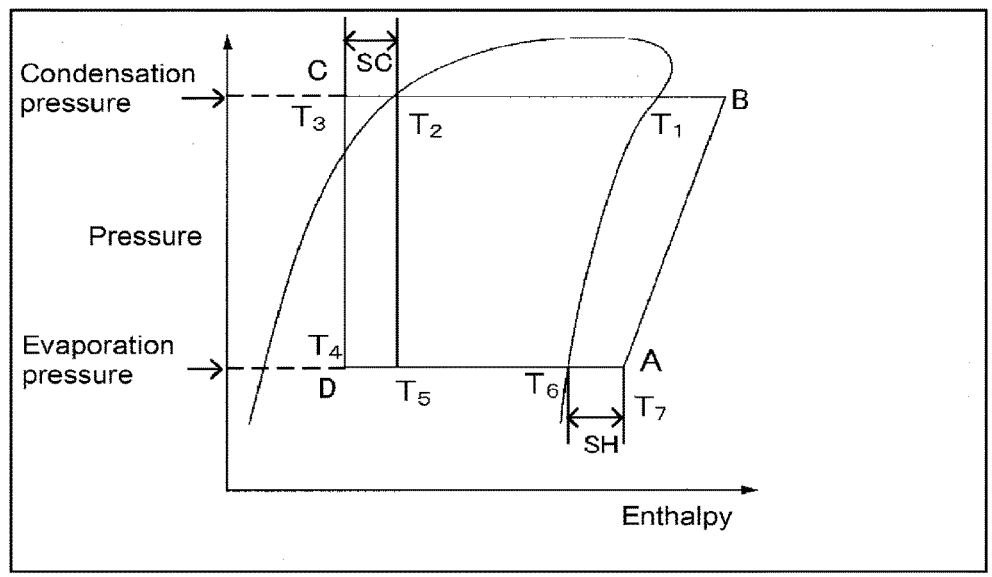
FIG. 6 is a cycle diagram illustrating the state change of a working fluid in a refrigerating cycle system in FIG. 3 on a pressure-enthalpy chart.

The AB process is a process wherein adiabatic compression is carried out by the compressor 11 to change the high temperature/low pressure working fluid vapor A to a high temperature/high pressure working fluid vapor B, and is represented by the line AB in FIG. 6.

The BC process is a process wherein isobaric cooling is carried out in the condenser 12 to change the high temperature/high pressure working fluid vapor B to a low temperature/high pressure working fluid C and is represented by the BC line in FIG. 6. The pressure in this process is the condensation pressure. Of the two intersection points of the pressure enthalpy chart and the BC line, the intersection point $T_1$ on the high enthalpy side is the condensing temperature, and the intersection point $T_2$ on the low enthalpy side is the condensation boiling point temperature. Here, the temperature glide in a case where a mixture of HFO-1123, HFO-1234yf and HFC-32 is a non-azeotropic mixture fluid, is represented by the difference between $T_1$ and $T_2$.

The CD process is a process wherein isenthalpic expansion is carried out by the expansion valve 13 to change the low temperature/high pressure working fluid C to a low temperature/low pressure working fluid D and is presented by the CD line in FIG. 6. $T_2$-$T_3$ corresponds to the supercoiling degree (hereinafter referred to as "SC" as the case requires) of the working fluid in the cycle of (i) to (iv), where $T_3$ is the temperature of the low temperature/high pressure working fluid C.

The DA process is a process wherein isobaric heating is carried out in the evaporator 14 to have the low temperature/low pressure working fluid D returned to a high temperature/low pressure working fluid vapor A, and is represented by the DA line in FIG. 6. The pressure in this process is the evaporation pressure. Of the two intersection points of the pressure enthalpy chart and the DA line, the intersection point $T_6$ on the high enthalpy side is the evaporation temperature. $T_7$-$T_6$ corresponds to the degree of superheat (hereinafter referred to as "SH" as the case requires) of the working fluid in the cycle of (i) to (iv), where $T_7$ is the temperature of the working fluid vapor A. $T_4$ indicates the temperature of the working fluid D.

Here, cycle performance of the working fluid is evaluated, for example, by the refrigerating capacity (hereinafter referred to as "Q" as the case requires) and the coefficient of performance (hereinafter referred to as "COP" as the case requires) of the working fluid. Q and COP of the working fluid are obtained respectively in accordance with the following formulae (1) and (2) from enthalpies $h_A$, $h_B$, $h_C$ and $h_D$ in the respective states A (after evaporation, high temperature and low pressure), B (after compression, high temperature and high pressure), C (after condensation, low temperature and high pressure) and D (after expansion, low temperature and low pressure) of the working fluid:

$$Q=h_A-h_D \quad (1)$$

$$COP=Q/\text{compression work}=(h_A-h_D)/(h_B-h_A) \quad (3)$$

COP means the efficiency in the refrigerating cycle system, and a higher COP means that a higher output, for example, Q, can be obtained by a smaller input, for example, an electric energy required to operate a compressor.

Further, Q means a capacity to freeze a load fluid, and a higher Q means that more works can be done in the same system. In other words, it means that with a working fluid having a higher Q, the desired performance can be obtained with a smaller amount, whereby the system can be downsized.

In the heat cycle system of the present invention using the working fluid of the present invention, in a refrigerating cycle system 10 shown in FIG. 3 for example, as compared with a case where R410 (a mixed fluid of HFC-32 and HFC-125 in a mass ratio of 1:1) which has been commonly used for an air-conditioning apparatus or the like, it is possible to achieve high levels of Q and COP, i.e. equal to or higher than those of R410A, while remarkably suppressing the global worming potential.

Further, since the temperature glide of the working fluid contained in the composition for a heat cycle system is suppressed to a certain level or lower, the composition change when the composition for a heat cycle system is put into a refrigerator or an air-conditioning apparatus from a pressure container and a change in the refrigerant composition in a refrigerator or an air-conditioning apparatus when the refrigerant leaks out from the refrigerator or the air-conditioning apparatus, can be suppressed to lower levels. Further, since the working fluid of the present invention has no self-decomposition property, a heat cycle system employing it will operate with high durability without any special measures to improve the durability.

At the time of operation of the heat cycle system, in order to avoid drawbacks due to inclusion of moisture or inclusion of non-condensing gas such as oxygen, it is preferred to provide a means to suppress such inclusion.

If moisture is included in the heat cycle system, a problem may occur particularly when the heat cycle system is used at low temperature. For example, problems such as freezing in a capillary tube, hydrolysis of the working fluid or the lubricating oil, deterioration of materials by an acid component formed in the cycle, formation of contaminants, etc. may arise. Particularly, if the lubricating oil is a polyglycol oil or a polyol ester oil, it has extremely high moisture absorbing properties and is likely to undergo hydrolysis, and inclusion of moisture decreases properties of the lubricating oil and may be a great cause to impair the long term reliability of a compressor. Accordingly, in order to suppress hydrolysis of the lubricating oil, it is necessary to control the moisture concentration in the heat cycle system.

As a method of controlling the moisture concentration in the heat cycle system, a method of using a moisture-removing means such as a desiccating agent (such as silica gel, activated aluminum or zeolite) may be mentioned. The desiccating agent is preferably brought into contact with the working fluid in a liquid state, in view of the dehydration efficiency. For example, the desiccating agent is located at the outlet of the condenser 12 or at the inlet of the evaporator 14 to be brought into contact with the working fluid.

The desiccating agent is preferably a zeolite desiccating agent in view of chemical reactivity of the desiccating agent and the working fluid, and the moisture absorption capacity of the desiccating agent.

The zeolite desiccating agent is, in a case where a lubricating oil having a large moisture absorption as compared with a conventional mineral lubricating oil is used, preferably a zeolite desiccating agent containing a compound represented by the following formula (3) as the main component in view of excellent moisture absorption capacity.

$$M_{2/n}O.Al_2O_3.xSiO_2.yH_2O \quad (3)$$

wherein M is a group 1 element such as Na or K or a group 2 element such as Ca, n is the valence of M, and x and y are values determined by the crystal structure. The pore size can be adjusted by changing M.

To select the desiccating agent, the pore size and the fracture strength are important.

In a case where a desiccating agent having a pore size larger than the molecular size of the working fluid is used, the working fluid is adsorbed in the desiccating agent and as a result, chemical reaction between the working fluid and the desiccating agent will occur, thus leading to undesired phenomena such as formation of non-condensing gas, a decrease in the strength of the desiccating agent, and a decrease in the adsorption capacity.

Accordingly, it is preferred to use as the desiccating agent a zeolite desiccating agent having a small pore size. Particularly preferred is sodium/potassium type A synthetic zeolite having a pore size of at most 3.5 Å. By using a sodium/potassium type A synthetic zeolite having a pore size smaller than the molecular size of the working fluid, it is possible to selectively adsorb and remove only moisture in the heat cycle system without adsorbing the working fluid. In other words, the working fluid is less likely to be adsorbed in the desiccating agent, whereby heat decomposition is less likely to occur and as a result, deterioration of materials constituting the heat cycle system and formation of contaminants can be suppressed.

The size of the zeolite desiccating agent is preferably from about 0.5 to about 5 mm, since if it is too small, a valve or a thin portion in pipelines of the heat cycle system may be clogged, and if it is too large, the drying capacity will be decreased. Its shape is preferably granular or cylindrical.

The zeolite desiccating agent may be formed into an optional shape by solidifying powdery zeolite by a binding agent (such as bentonite). So long as the desiccating agent is composed mainly of the zeolite desiccating agent, other desiccating agent (such as silica gel or activated alumina) may be used in combination.

The proportion of the zeolite desiccating agent based on the working fluid is not particularly limited.

If non-condensing gas is included in the heat cycle system, it has adverse effects such as heat transfer failure in the condenser or the evaporator and an increase in the working pressure, and it is necessary to suppress its inclusion as far as possible. Particularly, oxygen which is one of non-condensing gases reacts with the working fluid or the lubricating oil and promotes their decomposition.

The non-condensing gas concentration is preferably at most 1.5 vol %, particularly preferably at most 0.5 vol % by the volume ratio based on the working fluid, in a gaseous phase of the working fluid.

According to the above-described heat cycle system of the present invention, which employs the working fluid of the present invention having high durability, practically sufficient heat cycle performance can be obtained while suppressing influence over global warming, and there is substantially no problem with respect to the temperature glide.

EXAMPLES

Now, the present invention will be described in further detail with reference to Examples. However, it should be understood that the present invention is by no means restricted to specific Examples. Ex. 1 to 14 and 37 to 56 are Examples of the present invention, and Ex. 15 to 36 are Comparative Examples. Ex. 57 is an Example of R410A (a mixed fluid of HFC-32 and HFC-125 in a mass ratio of 1:1) used for comparative evaluation in the following Examples of the present invention and Comparative Examples, and is a Reference Example.

Ex. 1 to 56

In Ex. 1 to 32, 37 to 56, a working fluid comprising a mixture of HFO-1123, HFO-1234yf and HFO-32 in a proportion as identified in Table 6 or 7 was prepared, and the temperature glide and the refrigerating cycle performance (refrigerating capacity Q and coefficient of performance COP) were measured by the following methods. In Ex. 33, 34 and 35, a working fluid having a single composition of HFO-1123, HFO-1234yf or HFO-32 was prepared, and in Ex. 36, a working fluid comprising HFO-1123 and HFO-1234uf in a mass ratio of 1.1 was prepared, and the temperature glide and the refrigerating cycle performance (refrigerating capacity Q and coefficient of performance COP) were measured in the same manner as above.

[Measurement of Temperature Glide and Refrigerating Cycle Performance]

The temperature glide and the refrigerating cycle performance (refrigerating capacity and coefficient of performance) were measured with respect to a case where the working fluid was applied to a refrigerating cycle system 10 as shown in FIG. 3, and a heat cycle as shown in FIG. 6, that is, adiabatic compression by a compressor 11 in the AB process, isobaric cooling by a condenser 12 in the BC process, isenthalpic expansion by an expansion valve 13 in the CD process and isobaric heating by an evaporator 14 in the DA process, were carried out.

Measurement was carried out by setting the average evaporation temperature of the working fluid in the evaporator 14 to be 0° C., the average condensing temperature of the working fluid in the condenser 12 to be 40° C., the supercooling degree (SC) of the working fluid in the condenser 12 to be 5° C., and the degree of superheat (SH) of the working fluid in the evaporator 14 to be 5° C. Further, it was assumed that there was not loss in the equipment efficiency and no pressure loss in the pipelines and heat exchanger.

The refrigerating capacity and the coefficient of performance were obtained in accordance with the above formulae (1) and (2) from enthalpies h in the respective states of the working fluid, i.e. A (after evaporation, high temperature and low pressure), B (after compression, high temperature and high pressure), C (after condensation, low temperature and high pressure) and D (after expansion, low temperature and low pressure).

The thermodynamic properties required for calculation of the cycle performance were calculated based on the generalized equation of state (Soave-Redlich-Kwong equation) based on the law of corresponding state and various thermodynamic equations. If a characteristic value was not available, it was calculated employing an estimation technique based on a group contribution method.

The refrigerating capacity and the coefficient of performance were obtained as relative values based on the refrigerating capacity and the coefficient of performance of R410A measured in the same manner as above in the after-mentioned Ex. 57 respectively being 1.000. The temperature glide, the refrigerating capacity (relative to R410A) and the coefficient of performance (relative to R410A) are shown in Tables 6 and 7.

TABLE 6

| | Working fluid composition | | | Relative performance (relative to R410A) | | | | |
| --- | --- | --- | --- | --- | --- | --- | --- | --- |
| | HFO-1123 | HFO-1234yf | HFC-32 | Performance of coefficient | Refrigerating capacity | Coefficient of performance × refrigerating capacity | Temperature glide | |
| | [mass %] | [mol %] | [mass %] | [mass %] | | | | [° C.] | GWP |
| Ex. 1 | 50 | 42 | 10 | 40 | 0.965 | 1.123 | 1.083 | 1.6 | 270.6 |
| Ex. 2 | 40 | 34 | 20 | 40 | 0.978 | 1.048 | 1.025 | 3.1 | 270.9 |
| Ex. 3 | 30 | 26 | 30 | 40 | 0.994 | 0.974 | 0.968 | 4.5 | 271.3 |
| Ex. 4 | 20 | 18 | 40 | 40 | 1.010 | 0.899 | 0.909 | 5.4 | 271.7 |
| Ex. 5 | 10 | 9 | 50 | 40 | 1.026 | 0.825 | 0.846 | 5.8 | 272.0 |
| Ex. 6 | 40 | 32 | 10 | 50 | 0.975 | 1.117 | 1.089 | 1.7 | 338.0 |
| Ex. 7 | 30 | 24 | 20 | 50 | 0.989 | 1.042 | 1.031 | 3.1 | 338.4 |
| Ex. 8 | 20 | 17 | 30 | 50 | 1.004 | 0.967 | 0.971 | 4.2 | 338.8 |
| Ex. 9 | 10 | 9 | 40 | 50 | 1.020 | 0.892 | 0.910 | 4.8 | 339.1 |
| Ex. 10 | 30 | 23 | 10 | 60 | 0.986 | 1.107 | 1.091 | 1.7 | 405.5 |
| Ex. 11 | 20 | 16 | 20 | 60 | 1.000 | 1.032 | 1.031 | 2.9 | 405.9 |
| Ex. 12 | 10 | 8 | 30 | 60 | 1.014 | 0.957 | 0.970 | 3.6 | 406.2 |
| Ex. 13 | 20 | 15 | 10 | 70 | 0.996 | 1.093 | 1.088 | 1.6 | 473.0 |
| Ex. 14 | 10 | 7 | 20 | 70 | 1.009 | 1.018 | 1.028 | 2.5 | 473.3 |
| Ex. 15 | 80 | 78 | 10 | 10 | 0.936 | 1.105 | 1.034 | 1.1 | 68.1 |
| Ex. 16 | 70 | 70 | 20 | 10 | 0.947 | 1.034 | 0.979 | 2.6 | 68.5 |
| Ex. 17 | 60 | 62 | 30 | 10 | 0.960 | 0.962 | 0.924 | 4.3 | 68.9 |
| Ex. 18 | 50 | 53 | 40 | 10 | 0.977 | 0.891 | 0.870 | 5.9 | 69.3 |
| Ex. 19 | 40 | 44 | 50 | 10 | 0.995 | 0.820 | 0.816 | 7.3 | 69.6 |
| Ex. 20 | 30 | 34 | 60 | 10 | 1.013 | 0.747 | 0.757 | 8.2 | 70.0 |
| Ex. 21 | 20 | 23 | 70 | 10 | 1.028 | 0.672 | 0.690 | 8.2 | 70.4 |
| Ex. 22 | 10 | 12 | 80 | 10 | 1.039 | 0.593 | 0.617 | 6.9 | 70.7 |
| Ex. 23 | 70 | 64 | 10 | 20 | 0.944 | 1.118 | 1.056 | 1.3 | 135.6 |
| Ex. 24 | 60 | 57 | 20 | 20 | 0.956 | 1.045 | 1.000 | 2.9 | 136.0 |
| Ex. 25 | 50 | 48 | 30 | 20 | 0.971 | 0.972 | 0.944 | 4.5 | 136.4 |
| Ex. 26 | 40 | 40 | 40 | 20 | 0.988 | 0.900 | 0.889 | 6.0 | 136.7 |
| Ex. 27 | 30 | 31 | 50 | 20 | 1.006 | 0.827 | 0.832 | 7.1 | 137.1 |
| Ex. 28 | 20 | 21 | 60 | 20 | 1.023 | 0.753 | 0.770 | 7.6 | 137.5 |

TABLE 7

| | Working fluid composition | | | Relative performance (relative to R410A) | | | | |
| --- | --- | --- | --- | --- | --- | --- | --- | --- |
| | HFO-1123 | HFO-1234yf | HFC-32 | Performance of coefficient | Refrigerating capacity | Coefficient of performance × refrigerating capacity | Temperature glide | |
| | [mass %] | [mol %] | [mass %] | [mass %] | | | | [° C.] | GWP |
| Ex. 29 | 10 | 11 | 70 | 20 | 1.037 | 0.676 | 0.702 | 7.2 | 137.8 |
| Ex. 30 | 20 | 19 | 50 | 30 | 1.016 | 0.828 | 0.842 | 6.6 | 204.6 |
| Ex. 31 | 10 | 10 | 60 | 30 | 1.032 | 0.753 | 0.777 | 6.7 | 204.9 |
| Ex. 32 | 10 | 7 | 10 | 80 | 1.005 | 1.076 | 1.082 | 1.4 | 540.4 |
| Ex. 33 | 100 | 100 | 0 | 0 | 0.921 | 1.146 | 1.056 | 0 | 0.3 |
| Ex. 34 | 0 | 0 | 100 | 0 | 1.046 | 0.422 | 0.441 | 0 | 4.0 |
| Ex. 35 | 0 | 0 | 0 | 100 | 1.009 | 1.109 | 1.118 | 0 | 675.0 |
| Ex. 36 | 50 | 58 | 50 | 0 | 0.984 | 0.805 | 0.792 | 7.2 | 2.2 |
| Ex. 37 | 40 | 31 | 5 | 55 | 0.974 | 1.150 | 1.120 | 1.1 | 371.6 |
| Ex. 38 | 40 | 33 | 15 | 45 | 0.977 | 1.083 | 1.058 | 2.4 | 304.5 |
| Ex. 39 | 40 | 35 | 25 | 35 | 0.980 | 1.012 | 0.992 | 3.8 | 237.4 |
| Ex. 40 | 45 | 35 | 5 | 50 | 0.969 | 1.155 | 1.119 | 1.0 | 337.8 |
| Ex. 41 | 45 | 37 | 10 | 45 | 0.970 | 1.121 | 1.087 | 1.7 | 304.3 |
| Ex. 42 | 45 | 38 | 15 | 40 | 0.971 | 1.085 | 1.054 | 2.4 | 270.7 |
| Ex. 43 | 45 | 39 | 20 | 35 | 0.973 | 1.049 | 1.021 | 3.1 | 237.2 |
| Ex. 44 | 50 | 40 | 5 | 45 | 0.964 | 1.158 | 1.116 | 1.0 | 304.1 |
| Ex. 45 | 50 | 43 | 15 | 35 | 0.966 | 1.087 | 1.049 | 2.3 | 237.0 |
| Ex. 46 | 55 | 45 | 5 | 40 | 0.958 | 1.160 | 1.112 | 0.9 | 270.4 |
| Ex. 47 | 55 | 47 | 10 | 35 | 0.959 | 1.124 | 1.078 | 1.6 | 236.8 |
| Ex. 48 | 30 | 25 | 25 | 45 | 0.991 | 1.008 | 0.999 | 3.8 | 304.8 |

TABLE 7-continued

| | Working fluid composition | | | Relative performance (relative to R410A) | | | | |
|---|---|---|---|---|---|---|---|---|
| | HFO-1123 | HFO-1234yf | HFC-32 | Performance of coefficient | Refrigerating capacity | Coefficient of performance × refrigerating capacity | Temperature glide | GWP |
| | [mass %] | [mol %] | [mass %] | [mass %] | | | | [° C.] | |
| Ex. 49 | 30 | 24 | 15 | 55 | 0.987 | 1.075 | 1.061 | 2.4 | 371.9 |
| Ex. 50 | 30 | 22 | 5 | 65 | 0.984 | 1.138 | 1.120 | 1.1 | 439.0 |
| Ex. 51 | 35 | 31 | 30 | 35 | 0.988 | 0.975 | 0.964 | 4.5 | 237.6 |
| Ex. 52 | 35 | 30 | 25 | 40 | 0.986 | 1.011 | 0.996 | 3.8 | 271.1 |
| Ex. 53 | 35 | 29 | 20 | 45 | 0.984 | 1.045 | 1.029 | 3.1 | 304.7 |
| Ex. 54 | 35 | 28 | 15 | 50 | 0.982 | 1.079 | 1.060 | 2.4 | 338.2 |
| Ex. 55 | 35 | 27 | 10 | 55 | 0.980 | 1.113 | 1.091 | 1.8 | 371.8 |
| Ex. 56 | 35 | 26 | 5 | 60 | 0.979 | 1.145 | 1.120 | 1.1 | 405.3 |

As evident from the results in Tables 6 and 7, the working fluids in Ex. 1 to 14 and 37 to 56 having compositions within the range of the present invention, have a GWP and a temperature glide at low levels, have a coefficient of performance and a refrigerating capacity relative to R410A at comprehensively high levels, and have high durability, as compared with the working fluids in Ex. 15 to 36 having compositions out of the range of the present invention, which have a high GWP or a high temperature glide, which may undergo self-decomposition reaction of HFO-1123, or which have a coefficient of performance and a refrigerating capacity relative to R410A at comprehensively low levels.

A GWP and a temperature glide at low levels and a coefficient of performance and a refrigerating capacity relative to R410A at comprehensively high levels, mean a level such that all the conditions of a GWP of at most 510, a temperature glide of less than 6.6, a relative coefficient of performance of at least 0.958 and a relative refrigerating capacity of at least 0.820 are satisfied, and further, if both the relative coefficient of performance and the relative refrigerating capacity are lower than 1.000, their product is at least 0.950.

[Ex. 57]

In Ex. 57, with respect to R410A (a mixed fluid of HFC-32 and HFC-125 in a mass ratio of 1:1) to be relative comparison with the above Ex. 1 to 56, the temperature glide and the refrigerating cycle performance (refrigerating capacity Q and coefficient of performance COP) were measured in the same manner as the above. The refrigerating capacity and the coefficient of performance are 1.000 as shown in Table 8. The temperature glide and the result of calculation of GWP are shown in Table 8.

TABLE 8

| Working fluid composition [wt %] | | Relative performance (relative to R410A) | | Temperature glide [° C.] | GWP |
|---|---|---|---|---|---|
| HFC-125 | HFC-32 | Coefficient of performance | Refrigerating capacity | | |
| Ex. 57 (R410A) 50 | 50 | 1.000 | 1.000 | 0.2 | 2,087.5 |

Since R410A is a conventional working fluid, in Examples, the cycle performance is based on this working fluid, and when the cycle performance of a working fluid reaches the same level, the working fluid is evaluated to have practically sufficient cycle performance. R410A consists solely of HFCs, and has a high GWP global warming potential.

The refrigerating capacity of a working fluid is a factor which determines the size of apparatus itself. If HFO-1123 is combined with a compound having a lower refrigerating capacity than HFO-1123, for example, HFO-1234yf, the mixture (working fluid) comprising the combination has a lower refrigerating capacity than the working fluid consisting solely of HFO-1123. Accordingly, if such a mixture is used as an alternative to R410A, in order to make up for the low refrigerating capacity, an increase in the size of an apparatus itself and an increase in the energy used are required.

That is, to combine HFO-1123 and a compound having lower refrigerating capacity than HFO-1123 is not appropriate as a means to achieve the objects of the present invention. Particularly under the present circumstances that replacement of only the working fluid is desired without replacing a conventional apparatus employing R410A, an increase in the size of the apparatus is unfavorable.

However, for the working fluid of the present invention, HFO-1123 is intentionally combined with HFO-1234yf which is a compound having lower refrigerating capacity than HFO-1123, and further HFC-32 is added as an essential component, whereby a prescribed refrigerating capacity or higher was achieved.

The coefficient of performance of HFO-1123 alone does not reach a sufficient level, but it has a favorable relative coefficient of performance. The coefficient of performance indicates the efficiency of the working fluid and is very important considering the efficiency of equipment.

From the viewpoint of the temperature glide, since HFC-32 and HFO-1123 form an azeotropic composition or a pseudoazeotropic composition, the tendency of the temperature glide of the mixed fluid of HFO-1123, HFO-1234yf and HFC-32 is the same as the tendency of the temperature glide of a mixed fluid of HFO-1123 and HFO-1234yf, and the temperature glide can be suppressed to be a certain value or smaller when the composition range of the working fluid is within the composition range of the present invention, and accordingly the working fluid of the present invention can be used as an alternative to R410A.

As described above, it is found from the above results that in Ex. 1 to 14 and 37 to 56 which are Examples of the present invention, based on R410A, the cycle performance is at a practically sufficient level. Here, HFC-32 is a compound having a high GWP. However, the working fluid of the present invention comprising HFC-32, and HFO-1123 and HFO-1234yf having extremely low GWPs in combination, has a remarkably low GWP as compared with R410A.

Further, as described above, HFO-1123 has self-decomposition property by itself, however, the working fluid of the present invention which comprises HFO-1123, HFO-1234yf and HFC-32 with a composition within a sufficiently practical range, has self-decomposition suppressed and has high durability.

According to the working fluid of the present invention, the working fluid of the present invention having a low GWP and having high durability can be used as an alternative to R410A working fluid without replacement of equipment, and the present invention is useful under such present circumstances.

INDUSTRIAL APPLICABILITY

The working fluid of the present invention is useful as a refrigerant for a refrigerator (such as a built-in showcase, a separate showcase, an industrial fridge freezer, a vending machine or an ice making machine), a refrigerant for an air-conditioning apparatus (such as a room air-conditioner, a store package air-conditioner, a building package air-conditioner, a plant package air-conditioner, a gas engine heat pump, a train air-conditioning system or an automobile air-conditioning system), a working fluid for power generation system (such as exhaust heat recovery power generation), a working fluid for a heat transport apparatus (such as a heat pipe) or a secondary cooling fluid.

This application is a continuation of PCT Application No. PCT/JP2015/052533 filed on Jan. 29, 2015, which is based upon and claims the benefit of priority from Japanese Patent Application No. 2014-017031 filed on Jan. 31, 2014 and Japanese Patent Application No. 2014-148350 filed on Jul. 18, 2014. The contents of those applications are incorporated herein by reference in their entireties.

REFERENCE SYMBOLS

10: refrigerating cycle system, 11: compressor, 12: condenser, 13: expansion valve, 14: evaporator, 15, 16: pump.

What is claimed is:

1. A working fluid for heat cycle, comprising: trifluoroethylene, 2,3,3,3-tetrafluoropropene, and difluoromethane.

2. The working fluid of claim 1, wherein, based on a total amount of trifluoroethylene, 2,3,3,3-tetrafluoropropene, and difluoromethane, a proportion of trifluoroethylene is at least 10 mass % and less than 70 mass %, a proportion of 2,3,3,3-tetrafluoropropene is at most 50 mass %, and a proportion of difluoromethane is higher than 30 mass % and at most 44 mass %.

3. The working fluid of claim 2, wherein, based on the total amount of trifluoroethylene, 2,3,3,3-tetrafluoropropene, and difluoromethane, the proportion of trifluoroethylene is at least 20 mass % and less than 70 mass %, and the proportion of 2,3,3,3-tetrafluoropropene is at most 40 mass %.

4. The working fluid of claim 2, wherein, based on the total amount of trifluoroethylene, 2,3,3,3-tetrafluoropropene, and difluoromethane, the proportion of 2,3,3,3-tetrafluoropropene is at least 5 mass % and at most 40 mass %.

5. A composition for a heat cycle system, comprising: the working fluid of claim 1 and a lubricating oil.

6. A heat cycle system, which employs the composition of claim 5.

7. The heat cycle system of claim 6, which is a refrigerating apparatus, an air-conditioning apparatus, a power generation system, a heat transport apparatus, or a secondary cooling machine.

8. The heat cycle system of claim 6, which is a room air-conditioner, a store package air-conditioner, a building package air-conditioner, a plant package air-conditioner, a gas engine heat pump, a train air-conditioning system, an automobile air-conditioning system, a built-in showcase, a separate showcase, an industrial fridge freezer, an ice making machine, or a vending machine.

* * * * *